United States Patent
Johannesson

(10) Patent No.: US 10,509,977 B2
(45) Date of Patent: Dec. 17, 2019

(54) IMAGE SENSING DEVICE AND MEASURING SYSTEM FOR PROVIDING IMAGE DATA AND INFORMATION ON 3D-CHARACTERISTICS OF AN OBJECT

(71) Applicant: SICK IVP AB, Linkoping (SE)

(72) Inventor: Mattias Johannesson, Linkoping (SE)

(73) Assignee: SICK IVP AB, Linkoping (SE)

( * ) Notice: Subject to any disclaimer, the term of this patent is extended or adjusted under 35 U.S.C. 154(b) by 250 days.

(21) Appl. No.: 15/122,998

(22) PCT Filed: Mar. 5, 2014

(86) PCT No.: PCT/EP2014/054284
§ 371 (c)(1),
(2) Date: Sep. 1, 2016

(87) PCT Pub. No.: WO2015/131944
PCT Pub. Date: Sep. 11, 2015

(65) Prior Publication Data
US 2017/0069098 A1    Mar. 9, 2017

(51) Int. Cl.
| | |
|---|---|
| *G06K 9/20* | (2006.01) |
| *G06T 7/593* | (2017.01) |
| *G06T 5/50* | (2006.01) |
| *H04N 13/271* | (2018.01) |
| *G01B 11/25* | (2006.01) |

(52) U.S. Cl.
CPC ........ *G06K 9/2054* (2013.01); *G01B 11/2518* (2013.01); *G06T 5/50* (2013.01); *G06T 7/593* (2017.01); *H04N 13/271* (2018.05); *G01B 2210/52* (2013.01); *G06T 2207/10021* (2013.01); *G06T 2207/10144* (2013.01)

(58) Field of Classification Search
CPC combination set(s) only.
See application file for complete search history.

(56) References Cited

U.S. PATENT DOCUMENTS

| | | | |
|---|---|---|---|
| 5,750,985 A * | 5/1998 | Suzuki | H04N 5/3692 250/226 |
| 6,839,452 B1 | 1/2005 | Yang et al. | |
| 8,090,194 B2 * | 1/2012 | Golrdon | G01B 11/2513 382/154 |
| 8,441,535 B2 | 5/2013 | Morin | |

(Continued)

FOREIGN PATENT DOCUMENTS

| | | |
|---|---|---|
| GB | 2492387 | 1/2013 |
| WO | WO 2015/131944 | 9/2015 |

*Primary Examiner* — Tyler W. Sullivan
(74) *Attorney, Agent, or Firm* — Fish & Richardson P.C.

(57) ABSTRACT

An image sensing device (130) for providing image data relating to an image of an object (120; 121; 501) comprises an image sensor (131) having a sensor area (132) for sensing light. The image sensing device (130) defines (401) Regions Of Interest, "ROIs", (301 *a*-303*a*) in the sensor area (132). Each ROI (301 *a;* 302*a;* 303*a*) partially overlaps one or more of the other ROIs (301 *a*-303*a*). The ROIs (301 *a*-303*a*) are exposed individually to light from the object. The image sensing device (130) reads (403) partial image data belonging to groups respectively associated with the exposed ROIs (301 *a*-303*a*) and resulting from sensed light therein. Image data relating to the image of the object is provided based on a combination of the read partial image data.

25 Claims, 8 Drawing Sheets

(56) References Cited

U.S. PATENT DOCUMENTS

| | | | |
|---|---|---|---|
| 9,605,950 B2* | 3/2017 | Wolff | G01B 11/026 |
| 2003/0020827 A1 | 1/2003 | Bean et al. | |
| 2006/0202038 A1* | 9/2006 | Wang | G06K 7/10732 |
| | | | 235/462.24 |
| 2007/0171298 A1* | 7/2007 | Kurane | H04N 5/2353 |
| | | | 348/362 |
| 2009/0097704 A1* | 4/2009 | Savidge | G06K 9/32 |
| | | | 382/103 |
| 2009/0225189 A1* | 9/2009 | Morin | H04N 5/345 |
| | | | 348/229.1 |
| 2010/0030933 A1 | 2/2010 | Tsai et al. | |
| 2010/0141946 A1* | 6/2010 | Johannesson | G01B 11/2518 |
| | | | 356/338 |
| 2011/0043825 A1* | 2/2011 | Isozaki | G01B 11/245 |
| | | | 356/612 |
| 2012/0044381 A1* | 2/2012 | Jannard | H04N 5/235 |
| | | | 348/229.1 |
| 2012/0069214 A1* | 3/2012 | Shiohara | H04N 5/217 |
| | | | 348/229.1 |
| 2012/0113209 A1* | 5/2012 | Ritchey | H04N 5/2254 |
| | | | 348/14.02 |
| 2012/0257101 A1* | 10/2012 | Bub | H04N 1/195 |
| | | | 348/362 |
| 2013/0001404 A1* | 1/2013 | Meynants | H01L 27/14609 |
| | | | 250/208.1 |
| 2014/0183263 A1* | 7/2014 | Chen | G06K 7/10752 |
| | | | 235/440 |
| 2015/0109468 A1* | 4/2015 | Laroia | G02B 13/02 |
| | | | 348/208.6 |
| 2015/0358571 A1* | 12/2015 | Dominguez Castro | H04N 5/345 |
| | | | 348/308 |
| 2016/0037093 A1* | 2/2016 | Mandelli | H04N 5/32 |
| | | | 348/296 |
| 2017/0228884 A1* | 8/2017 | Yoshida | G06T 7/62 |
| 2019/0104268 A1* | 4/2019 | Shirini | H04N 5/378 |
| 2019/0174086 A1* | 6/2019 | Wang | G06K 7/10722 |

* cited by examiner

IMAGE SENSING DEVICE AND MEASURING SYSTEM FOR PROVIDING IMAGE DATA AND INFORMATION ON 3D-CHARACTERISTICS OF AN OBJECT

This application is a National Stage Application under 35 U.S.C. § 371 and claims the benefit of International Application No. PCT/EP2014/054284, filed Mar. 5, 2014. The disclosure of the foregoing application is hereby incorporated by reference in its entirety.

TECHNICAL FIELD

Embodiments herein relate to an image sensing device, a measuring system, methods thereof, a computer program and a computer program product. In particular embodiments herein relate to provision of image data relating to an image of an object and provision of three dimensional characteristics of the object.

BACKGROUND

Industrial vision cameras and systems for factory and logistic automation are often based on three-dimensional (3D) machine vision, where 3D-images of an object are captured. By 3D-images is referred to images that encode also "depth" information and not only intensity and/or colour for pixel positions in two-dimensions (2D) as a conventional image. Processing is then applied to extract information on characteristics of the object from the 3D images, i.e. 3D-characteristics of the object.

3D machine vision systems are often based on active triangulation. In such a system there is a light source illuminating the object with a specific light pattern. It is common to use a sheet of light as the specific light pattern, e.g. produced by laser light. A camera with an image sensor is then arranged in relation to the light source and object so that the specific light pattern, when reflected by the object, become incident light on the image sensor. The portion of the object which by reflection causes the incident light on the image sensor is captured by the camera and image sensor, and image data is produced. With knowledge of the geometry of the system, the image data can then e.g. be converted to so called range data that provides information on a 3D shape, which may be referred to as a profile, of the object, corresponding to where the specific light pattern was reflected on the object. By moving the light source and/or the object, so that multiple portions of the object are illuminated and reflected light captured by the image sensor, data describing a more complete 3D shape of the object can be produced, e.g. corresponding to multiple, consecutive profiles, and a 3D model of the object can be created.

In particular for industrial applications, time is often strongly linked to cost and one of the most important factors is therefore high speed. It is desirable to be able to capture, process and provide output, e.g. image data corresponding to profiles of the object, at sufficient accuracy and speed. What is sufficient is different from case to case and e.g. dependent on application, what the machine vision output is to be used for etc.

One speed limiting factor of such 3D machine vision system as described above is the speed of the image sensor being used, which may be implemented as an Application Specific Integrated Circuit (ASIC) and/or comprised in a System on Chip (SoC). The image sensor is typically comprised in an image sensing device that may implement also additional functionality e.g. relating to processing of data output from the image sensor. One example of an image sensing device is a camera used by a 3D machine vision system, which camera comprises a lens and electronics connecting to the image sensor. Another example is an SoC comprising the image sensor and some processing of image data provided by the image sensor. In any case, the speed of the image sensing device is related to how fast the image data is acquired and provided by the image sensor, and to how fast any involved processing is carried out. Often image sensing devices for 3D machine vision systems are specifically adapted for certain application(s), e.g. allowing certain control of the image sensing device and/or provide certain functionality, which may involve that more or less processing is made "on-chip". This kind of specific adaptation for certain application(s) is typically provided in order to enable higher speed, lower cost, smaller size, lower power consumption etc.

One example of an image sensing device comprising an image sensor pixel array is disclosed in GB 2492387 (A). The image sensor pixel array comprises a plurality of pixel structures. The arrangement enables selective control of pixel rows and columns which may be chosen to define individual pixels or groups of pixels/pixel regions for exposure time control different to that applied to the rest of the array.

SUMMARY

In view of the above an object is to provide improvements with regard to provision of 3D-characteristics of an object in 3D machine vision systems.

According to a first aspect of embodiments herein, the object is achieved by a method, performed by an image sensing device, for providing image data relating to an image of an object. The image sensing device comprises an image sensor having a sensor area for sensing light. The image sensing device defines Regions Of Interest (ROIs) in the sensor area. Each ROI partially overlaps one or more of the other ROIs. The image sensing device exposes the ROIs individually to light from the object. The image sensing device reads partial image data belonging to groups respectively associated with the exposed ROIs and resulting from sensed light therein. The image sensing device provides, based on a combination of the read partial image data, the image data relating to the image of the object.

According to a second aspect of embodiments herein, the object is achieved by an image sensing device for providing image data relating to an image of an object. The image sensing device comprises an image sensor having a sensor area for sensing light. The image sensing device is configured to define ROIs in the image sensor area. Each ROI partially overlap one or more of the other ROIs. The image sensing device is configured to expose the ROIs individually to light from the object. Further, the image sensing device is configured to read partial image data belonging to groups respectively associated with the exposed ROIs and resulting from sensed light therein. Moreover, the image sensing device is configured to provide, based on a combination of the read partial image data, the image data relating to the image of the object.

According to a third aspect of embodiments herein, the object is achieved by a computer program that when executed by a data processing apparatus causes the image sensing device to perform the method according to the first aspect and/or causes hardware to be synthesized, and/or be configured, as the image sensing device according to the second aspect.

According to a fourth aspect of embodiments herein, the object is achieved by a computer program product comprising a computer readable medium and a computer program according to the third aspect stored on the computer readable medium.

According to a fifth aspect of embodiments herein, the object is achieved by a measuring system for providing information on three dimensional characteristics of the object based on provided image data from the image sensing device according to the second aspect. The measuring system comprises the image sensing device and further comprises a light source configured to illuminate the object with a specific light pattern. The light source and the image sensor are arranged in relation to each other so that the light pattern, when reflected by the object, at least partly become incident light on the sensor area and sensed as said light from the object. Thereby the provided image data comprise information convertible to the three dimensional characteristics of the object regarding positions on the object, which positions cause said incident light on the sensor area.

To solve problems relating to provision of 3D characteristics of the object through imaging, it is for various reasons desirable to be able to apply different exposures and/or processing to different parts of each image used for providing the 3D characteristics. This, as well as fast execution, is enabled by embodiments herein. For example, through the ROIs and use thereof as described above, different exposure and at the same time relatively simple processing of image data are enabled per ROI, in particular for the purpose of providing information on 3D characteristics based on the image data. Instead of e.g. exposing the sensor area fully and sequentially for different exposures, the partially overlapping ROIs enable parallel exposing and processing involving reduced data amounts, while the partial overlap at the same time reduces the risk of missing information, such as information on peak positions, important for the provision of the information on 3D characteristics. Also, on-chip implementation is facilitated by the handling and processing per ROI. Moreover, on-chip processing of partial image data per ROI is facilitated and enables reduction of data amounts to be output from the chip for further processing compared to solutions where e.g. all image data for the full image is processed out-of-chip.

BRIEF DESCRIPTION OF THE DRAWINGS

Examples of embodiments herein are described in more detail with reference to the appended schematic drawings.

DETAILED DESCRIPTION

Figure 1A:
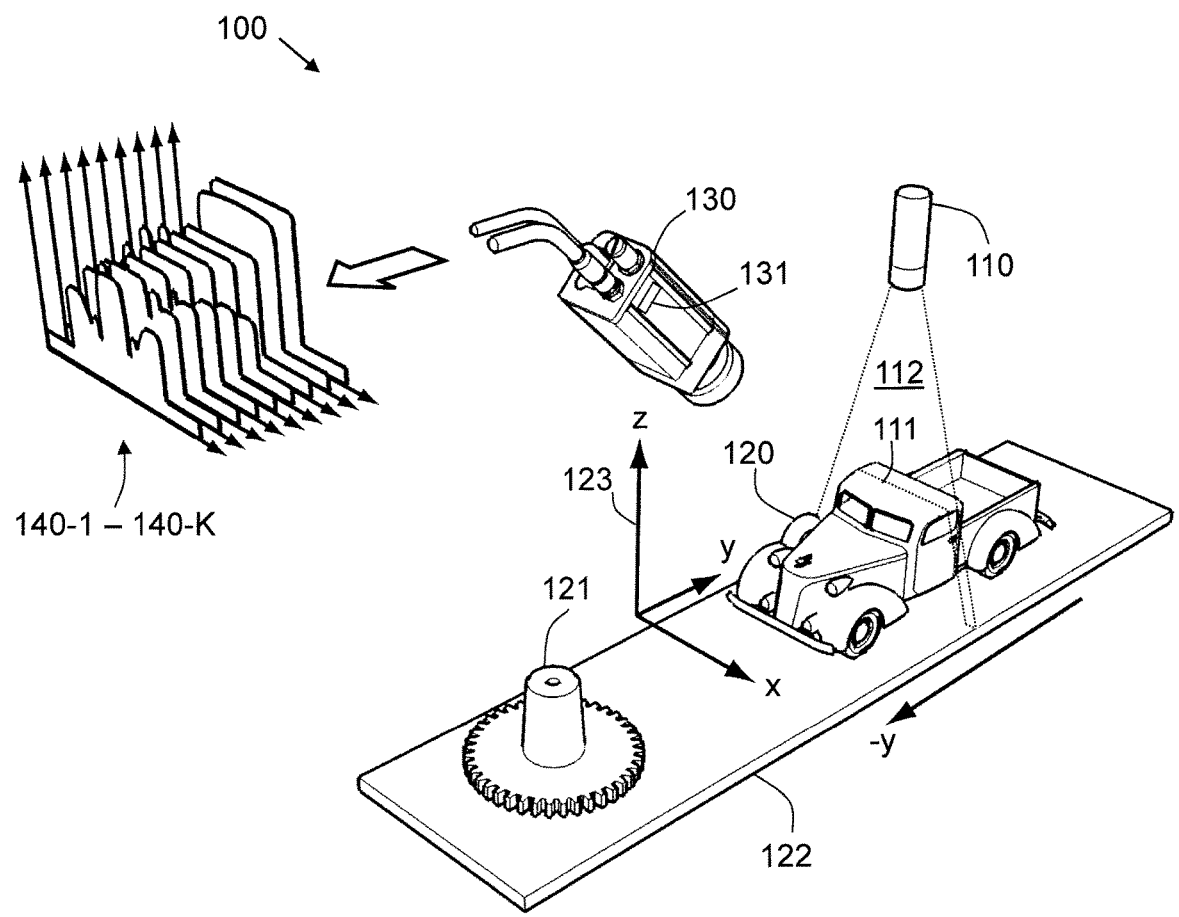
FIG. 1a is a schematic block diagram depicting an example of a measuring system relevant for embodiments herein.

FIG. 1a is a schematic block diagram depicting an example of a measuring system 100 in relation to which embodiments herein will be explained. The measuring system is suitable for providing information on three dimensional (3D) characteristics of objects and may correspond to a machine vision system configured to for active triangulation. The measuring system 100 comprises a light source 110 for illuminating objects to be imaged with a specific light pattern 112, in the figure exemplified as a sheet of light. The light may, but not need to be, laser light. In the shown example, the objects are exemplified by a first object 120 in the form of a car and a second object 121 in the form of a gear wheel construction. When the specific light pattern 112 is incident on an object, this corresponds to a projection of the specific light pattern 112 on the object, which may be viewed upon as the specific light pattern 112 intersects the object. For example, in the shown example, the specific light pattern 112 exemplified as the sheet of light, results in a light line 111 on the first object 120. The specific light pattern 112 is reflected by the object, more specifically by portions of the object at the intersection, i.e. at the light line 111 in the shown example. The measuring system 100 further comprises an image sensing device 130, in the figure exemplified as a camera, comprising an image sensor 131, which are arranged in relation to the light source 110 and the objects to be imaged so that the specific light pattern, when reflected by the objects, become incident light on the image sensor 131. The image sensor 130 is an arrangement, typically implemented as a chip, for converting incident light to image data. Said portions of the object, which by reflection causes said incident light on the image sensor 131, may thereby be captured by the image sensing device 130 and the image sensor 131, and corresponding image data may be produced and provided for further use. For example, in the shown example, the specific light pattern 112 will at the light line 111 on a portion of the car roof of the first object 120 be reflected towards the image sensing device 130 and image sensor 131, which thereby may produce and provide image data encoding information about said portion of the car roof. With knowledge of the geometry of the measuring system 100, e.g. how image sensor coordinates relate to world coordinates, e.g. coordinates of a coordinate system 123, relevant for the object being imaged, the image data may be converted to provide information on 3D characteristics, e.g. a 3D shape or profile of the object being imaged.

By moving e.g. the light source 110 and/or the object to be imaged, such as the first object 120 or the second object 121, so that multiple portions of the object are illuminated and cause reflected light upon the image sensor 131, image data describing a more complete 3D shape of the object may be produced, e.g. corresponding to multiple, consecutive, profiles of the object, such as the shown profiles 140-1-140-K of the first object 120.

As indicated in FIG. 1a, a conveyor belt 122 or similar may be used to move the objects through the specific light pattern 112, with the light source 110 and image sensing device 130 typically stationary, so that all portions of each object, or at least all portions facing the light source 110, are illuminated.

The information on said 3D characteristics, e.g. said 3D shape(s) or profile(s), may comprise data describing 3D characteristics in any suitable format. So called range data is one example of data often used for describing 3D characteristics. The information on 3D characteristics may be provided by the image sensing device 130 directly or from e.g. a computer, and/or some purpose specific hardware, configured to operate on output data from the image sensing device 130. The output data is based on image data from the image sensor 131.

Attention is drawn to that FIG. 1a is only schematic and for exemplifying purpose and that not everything shown in the figure is required for all embodiments herein, as will be evident from the below.

Figure 1B:
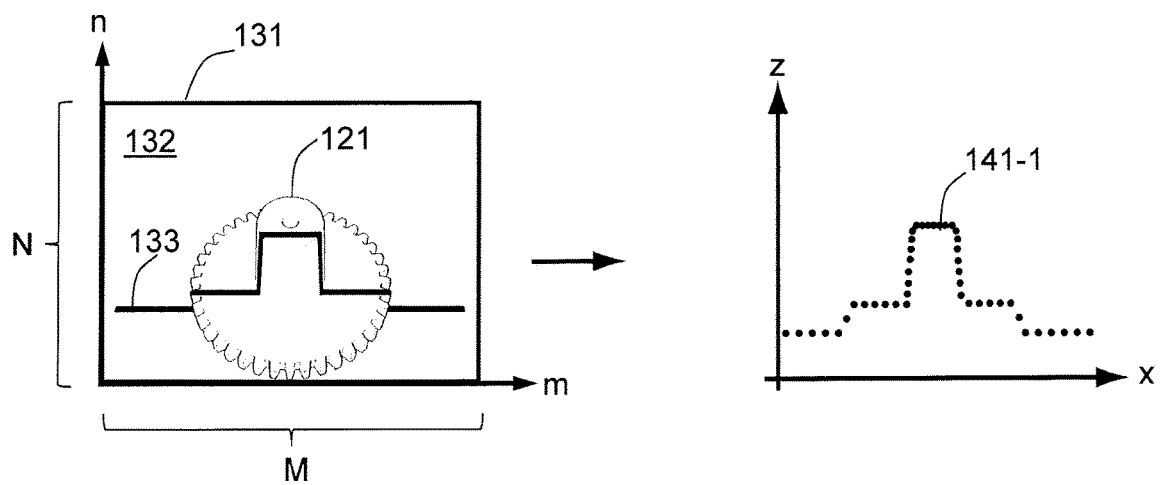
FIG. 1b is a schematic illustration for explaining relations and operational principles regarding the measuring system.

FIG. 1b is a schematic illustration for showing and describing basic principles of the image sensor 131 and how 3D characteristics of an object may be provided based on image data from the image sensor 131. The left part of FIG. 1b shows a sensor area 132 of the image sensor 131. The sensor area 132 is suitable for sensing light, i.e. light incident on the sensor area 132, and has a resolution of N×M image sensing elements, corresponding to pixels, where N is the total number of rows with sensing elements and M is the total number of columns with sensing elements. The sensor area 132 is drawn in a local coordinate system of the image sensor, where m denotes column position and n denotes row position. Hence, n may be used herein to indicate an arbitrary row of the N rows and m may be used herein to indicate an arbitrary column of the M columns. An example of a first incident light pattern 133 is shown in the sensor area 132, which first incident light pattern 133 is a result from the second object 121 reflecting the specific light pattern 112. In FIG. 1b, merely for facilitating understanding, the second object 121 has been drawn in the sensor area 132. The image sensor 131 may sense the first incident light pattern 133, wherein said image sensing elements being illuminated by the first incident light pattern 133 should register higher intensities than other image sensing elements of the image sensor 131, at least under appropriate exposure conditions not over- or underexposing said other image sensing elements.

In the shown example of FIG. 1b, each row n corresponds to a certain distance to the second object 121 and each column m corresponds to a position in a profile of the second object 121. It may thus be expected to be only one true reflection per column m. As a result, it is thus, at least in theory, possible to search for intensity peaks per column and expect such peaks, e.g. the greatest peak, to be the true reflection in each column. If this is repeated for every column, a pixel pattern corresponding to the incident light pattern 133 may be identified. Since the pixel pattern is in coordinates n, m of the image sensor 131, a conversion, based on geometry of the measuring system 100, may take place to a converted pattern in world coordinates, which in FIG. 1b is illustrated by the arrow and the right part of the figure, where said converted pattern, in world coordinates, corresponds to a profile 141-1 of the second object 121.

Before presenting details regarding embodiments herein, further problems relating to 3D machine vision systems based on triangulation, will be discussed and exemplified.

In many image sensors, a main limitation of acquisition speed is bandwidth relating to how fast image data can be provided by an image sensor for further processing by a measuring system comprising the image sensor. When high bandwidth is required, e.g. to be able to reach a required speed, this in turn typically results in that a large amount of physical signal pins is needed and also results in large power consumption. This is undesirable and often in itself limiting in e.g. system miniatyrization. If extraction of M peak positions from an N×M image sensor is implemented integrated with the image sensor, e.g. in an image sensing device being an ASIC or SoC, the amount of data needed to be output from the image sensor would be greatly reduced. Such, or similar, direct processing, i.e. processing integrated with the image sensor, resulting in that less data needed to be read out, and/or be read out less frequently, may reduce the bandwidth so that same imaging speed can be achieved at much lower output bandwidth and power consumption. However, it may also put limitations on the complexity of the algorithms used to extract the peak position since more complex algorithms in practise may be difficult and/or are inefficient to implement integrated with the image sensor. The processing to find "true peaks", each corresponding to a single, true reflection, as explained above, may involve finding a position of a single peak, e.g. the strongest or another specific peak fulfilling some other criterion or criteria, such as the first or last peak of acceptable strength, in each column. If the processing need to consider other information to extract the position of a true peak in the presence of false peaks, this adds complexity, which has more or less of a speed-limiting effect. One solution here may be to extract multiple peak candidates in a first stage and then find the true peak among the multiple peak candidates in a second stage. On the other hand, the overhead for handling multiple peaks and two stage processing may reduce the throughput of the system, which can be more or less critical depending on application.

Another speed-limiting factor may be the exposure time needed by the image sensor for capture of incident light in order to get a detectable signal.

Multiple reflections are often a problem in the above-described type of systems. Multiple reflections occur when the light from the light source 110 reflected from one surface is further reflected in one or more surfaces before it become incident on the image sensor and results in a false reflection. It may e.g. be known that there shall be only one true reflection, e.g. one in each column m of the M columns of the image sensor 131, but there are multiple candidates present, all but one false. Multiple reflections may also appear due to geometrical distortion and/or also ambient noise disturbances. Geometrical distortions occur when the geometry, e.g. around step edges, of the object being imaged causes multiple reflections. In practise a false reflection may be stronger than a true reflection. The false reflection may also be sharper, i.e. more narrow, than the true reflection and thus it is not always possible to use the intensity or width of an intensity peak registered by the sensor to discriminate a true reflection from a false. Hence, on an image sensor it is in practise often difficult to discriminate between true and false reflections. One solution may be to extract all possible candidate positions for intensity peaks and then have a post-processing step, typically outside the image sensor, which filters out unwanted data by for instance applying smoothness criteria regarding the full image. So called dynamic programming is an example of a possible technique to be applied on the candidate positions for finding an eventual, single, position per column.

Another problem is dynamic range, where the reflection of the light by an object may be very weak in some parts and very strong in others, especially if there are specular reflections. In a specular reflection a very large part of the incident light is reflected in a specific direction. The opposite is a diffuse reflection, where light is reflected uniformly in all directions. In practice most surfaces give a mix of specular and diffuse reflections. One contributing factor to the problem of dynamic range is that the intensity of detected diffusely reflected light, e.g. from a divergent laser plane, typically decreases in a non-linear fashion as a function of the distance. The divergence of the light gives less incident energy per unit area farther away from the light source. Another contributing factor is that a camera implementing or comprising the image sensing device 130, collects light though a lens with a relatively small aperture. Light reflected from an object at a longer distance will be less likely to pass through the aperture than light reflected from a shorter distance. For example, in the situation shown in FIG. 1b, intensities measured by sensing elements belonging to a lower part of the image sensor area 132, which lower part corresponds to longer distances, may sense lower intensities than sensed by sensing elements in an upper part.

The width of observed intensity peaks may also have variations over the field-of-view, i.e. there is also a peak width problem. If a measuring system, e.g. corresponding to the measuring system 100, is not adjusted for "tilted plane" focus using the so called Scheimpflug principle, certain parts of the laser plane may be out-of-focus. This may result in a distribution where the width of observed intensity peaks e.g. are larger farther away than near in the depth-of-field. For example, with reference to FIG. 1b, peak positions at the lower part may correspond to intensity peaks of greater width than the peak positions at the upper rows or vice versa. High precision extraction of sub-pixel peak position may work best with a specific width of the distribution and thus may be negatively affected by large variations of width.

Also, due to the geometrical properties of a triangulation-based measuring system as in FIG. 1a, a resolution in depth measurement ($\Delta R$) per unit pixel ($\Delta P$) of the image sensor 131 increases with the depth, i.e. there is as well a resolution problem. To make a system having a uniform measurement resolution, so called binning may be utilized in the near distance to reduce the resolution in $\Delta P$ in that part to obtain a more uniform $\Delta R$ resolution.

Any solution to the above problems should preferably at least not worsen any other problem, which would be counterproductive, and preferably a solution should alleviate more than one problem at the same time or at least be compatible with other solutions for alleviating other problems.

Figure 2:
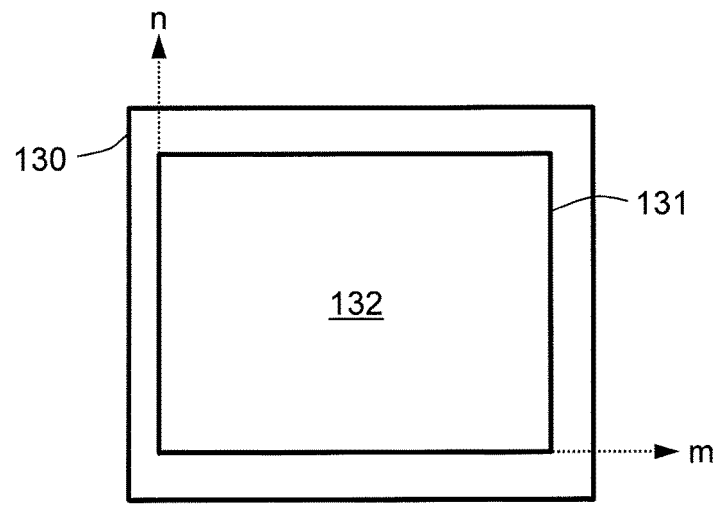
FIG. 2 is a schematic block diagram depicting an image sensing device according to embodiments herein.

FIG. 2 is a schematic block diagram depicting the image sensing device 130 separate from the measuring system 100. The image sensing device 130 comprises the image sensor 131. The image sensing device 130 is suitable for providing image data relating to an image of an object, such as the first object 120 and second object 121. The image sensing device 130 may be implemented as a chip, which may referred to as a sensor chip, e.g. in the form of an ASIC or a collection of chips integrated in a SoC. The image sensing device 130 may then be used e.g. in a camera. Note that the image sensing device 130 need not be implemented as a (single) chip or SoC although it is advantageous in order to enable higher speed. The image sensing device 130 may instead e.g. be implemented using interconnected discrete parts, such as one chip with the image sensor 131 and one or more other chips arranged to operate on output from the image sensor 131. For example, the image sensing device 130 may be implemented as a camera, such as the camera shown in FIG. 1a, comprising said interconnected discrete parts.

FIGS. 3a-d are schematic block diagrams showing examples of how Regions Of Interest (ROIs) relating to embodiments herein may be defined in the image sensor area 132. A ROI is a subarea of the sensor area 132.

Figure 3A:
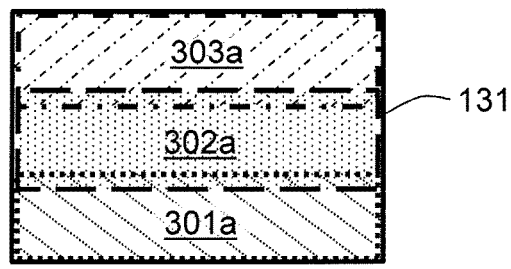
FIGS. 3a-d are schematic block diagrams showing examples of how Regions Of Interest (ROIs) relevant for embodiments herein may be defined in a sensor area.

FIG. 3a shows a first ROI 301a, a second ROI 302a, and a third ROI 303a of a first example group of ROIs, where each ROI partially overlap one or more other ROIs. More particularly, the first and second ROIs 301a, 302a partially overlap each other and the second and third ROIs 302a, 303a partially overlap each other. The ROIs partially overlapping each other have a common partial overlap with rows of the involved ROIs fully overlapping and columns of the involved ROIs partly overlapping. Each ROI covers complete rows of the sensor area 132 and the ROIs cover the full image sensor area 132. The shown ROIs are an example of ROIs consecutively located along columns of the sensor area 132. The shown ROIs are also an example of where each ROI has overlap either along one of its sides or along two opposite of its sides. The ROIs 301a-303a are used in an example and discussed in some further detail below in connection with FIG. 5.

Figure 3B:
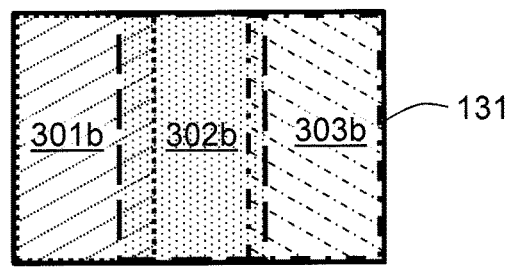

FIG. 3b shows a fourth ROI 301b, a fifth ROI 302b, and a sixth ROI 303b of a second example group of ROIs, where each ROI partially overlaps one or more other ROIs. More particularly, the fourth and fifth ROIs 301b, 302b partially overlap each other and the fifth and sixth ROIs 302b and 303b partially overlap each other. The ROIs partially overlapping each other have a common partial overlap with columns of the involved ROIs fully overlapping and rows on the involved ROIS partly overlapping. Each ROI covers complete columns of the sensor area 132 and the ROIs cover the full image sensor area 132. The shown ROIs are an example of ROIs consecutively located along rows of the sensor area 132. The shown ROIs are also an example of embodiments where each ROI has overlap either along only one of its sides or along two opposite of its sides, e.g. along two opposite parallel sides.

Figure 3C:
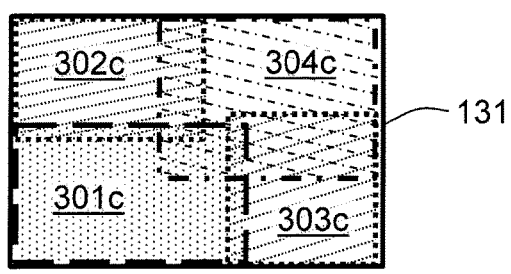

FIG. 3c shows seventh to tenth ROIs 301c-304c of a third example group of ROIs, where each ROI partially overlap two or more other ROIs. Each ROI covers only a part of rows and columns and the ROIs cover the full image sensor area 132. The shown ROIs are an example of where each ROI has overlap along at least two of its sides, which sides are along two perpendicular sides, i.e. not opposite sides.

Figure 3D:
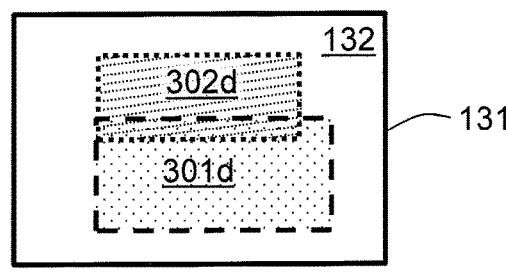

FIG. 3d shows a eleventh ROI 301d and a twelfth ROI 302d of a fourth example group of ROIs, where each ROI partially overlap one or more other ROIs. The ROIs partially overlapping each other, i.e. here the eleventh ROI 301d and the twelfth ROI 302d, have a common partial overlap with rows of the involved ROIs fully overlapping and columns of the involved ROIs partly overlapping. Each ROI partly covers rows of the sensor area 132 and partly covers columns of the sensor area 132. The ROIs cover only part of the image sensor area 132. Similar as in FIG. 3a, the shown ROIs are an example of ROIs consecutively located along columns of the sensor area 132. The shown ROIs are also an example of where each ROI has overlap only along one of its sides.

How ROIs, such as exemplified in Figured 3a-d, relate to embodiments herein is discussed in the following.

Figure 4:
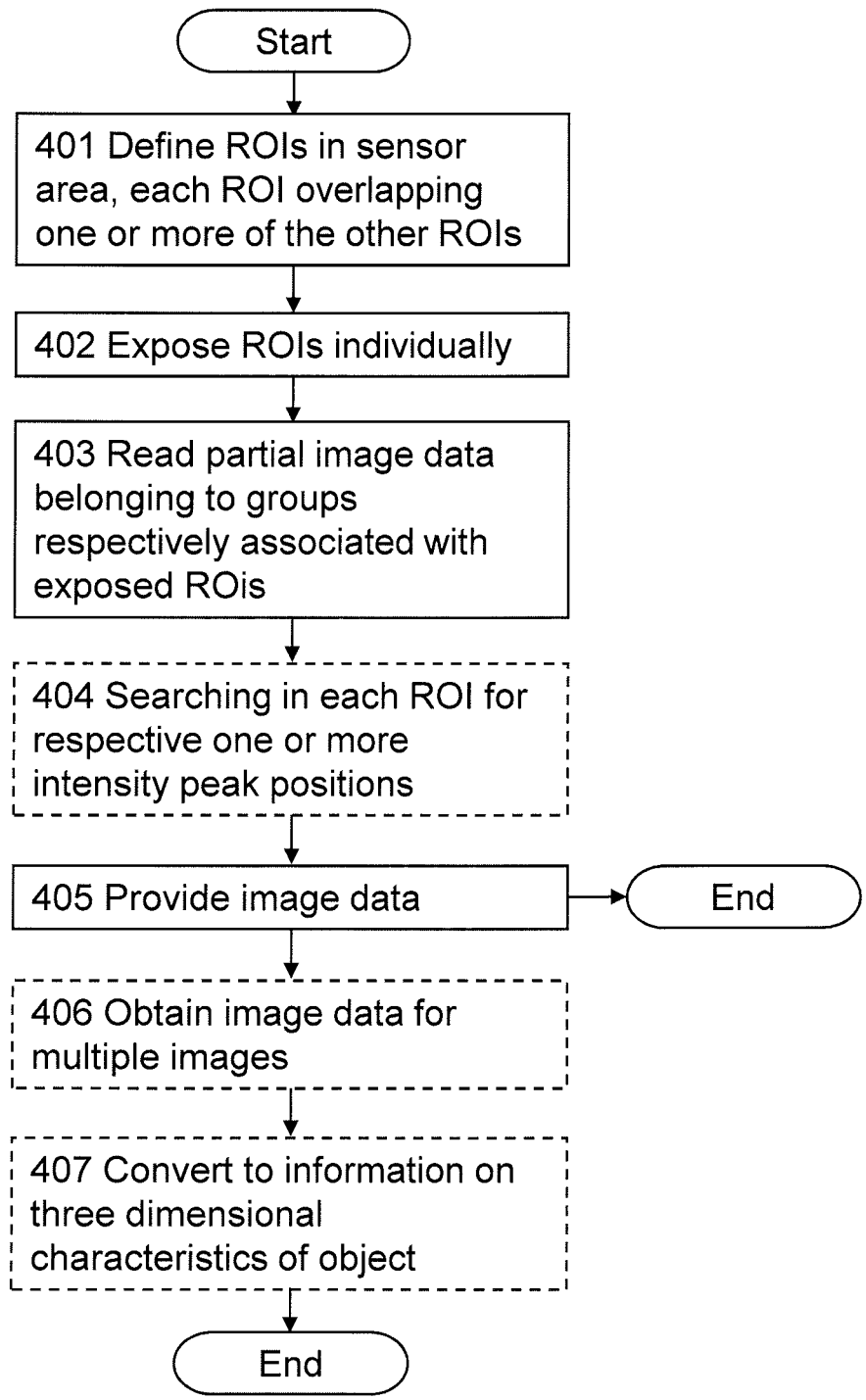
FIG. 4 is a flow chart illustrating a method, performed by an image sensing device, according to embodiments herein.

Examples of embodiments herein relating to a method, e.g. performed by the image sensing device 130, for providing image data relating to an image of an object, e.g. the first object 120 or second object 121, will now be further elaborated and described with reference to the flowchart depicted in FIG. 4. The image sensing device 130 comprises the image sensor 131 having the sensor area 132 for sensing said image. As will be realized from the below, image data of interest to provide is typically image data at least convertible to information on three dimensional characteristics, e.g. to any of the profiles 140-1, 141-1, of the object.

The method comprises the following actions, which actions may be taken in any suitable order. Further, actions may be combined.

Action 401

The image sensing device 130 defines ROIs, e.g. corresponding to any of the example group of ROIs discusses above in connection with FIGS. 3*a-d*, in the sensor area 132. Each ROI partially overlaps one or more of the other ROIs.

The image sensing device 130 may define the ROIs based on a pre-configured set or sets of ROIs and/or based on an input to the image sensing device 130, which input may be user controllable. The input may be in the form of configuration data, e.g. instructions, and/or electrical signalling, and may determine how the ROIs will be defined. The pre-configuration and/or input may e.g. be accomplished via software running on a computer, or other control device, connected to a communication port of the image sensing device 130.

For example, the configuration data may comprise information on coordinates determining size and position of the ROIs in the sensor area 132. In another example, the configuration data comprise information on a number of ROIs and on a size of a partial overlap. It may at the same time be pre-configured that the ROIs e.g. shall be consecutively located along columns of the sensor area 132, such as in FIG. 3*a*, and/or be placed evenly covering the full sensor area 132, and have a partial overlap along columns of the sensor area 132 according to said size of the partial overlap. In yet another example, the input is via electrical signalling, e.g. that set pins of a chip implementing or comprising the image sensing device 130 to a high or low voltage, thereby choosing a specific setting that has a specific meaning to the image sensing device 130. For example, 4 pins may be set to voltages that have a meaning of "10 ROIs" (or rather a binary number encoded by the voltages may have this meaning). Similarly, one pin may be set to a voltage that has a meaning of "ROIs shall be consecutively located along rows of the sensor area 132" selected from 2 alternatives (e.g. consecutive along columns or rows). Two other pins may be set to voltages that have a meaning of "10 pixel partial along rows of the sensor area 132", selected from 4 pre-configured alternatives (e.g. 5, 10, 15 or 20 pixel partial overlap).

The number of ROIs being defined should be suitable in view of context, purpose and circumstances related to use of the method. Given this the skilled person may pre-configure or control, e.g. by means of user control as discussed above, the number of ROIs to be defined. However, in most situations a suitable number of ROIs may be in a range of 2 to 10.

In some embodiments, the ROIs are consecutively located along either the pixel columns M or the pixel rows N of the image sensor area 132, e.g. parallel with the arrow marked n or the arrow marked m in FIG. 2. This is exemplified in FIGS. 3*a-b* and FIG. 3*d*. As a result, less complex implementation and faster processing are enabled.

The overlap between the ROIs is further discussed below in connection with FIGS. 5-7.

Action 402

The image sensing device 130 exposes the ROIs, as defined in Action 401, individually to light from the object, e.g. reflected from the first object 120 or second object 121. The light from the object become incident light on the sensor area 132. As should be realized, by exposing a ROI in the sensor area 132 to light is meant that sensing elements in the sensor area 132, which sensing elements are within the ROI, are exposed to and senses the incident light. By exposed individually is meant exposed in an individual unique manner, which e.g. may result from that each ROI is associated with its own shutter that may be used for exposing sensing elements within the ROI without exposing sensing elements outside the ROI. Each ROI associated with its own shutter e.g. means that there is a respective "local", per ROI, shutter that is the same for all sensing elements of the ROI. One implication of exposing the ROIs individually is that the sensing elements of each ROI may have a common exposure time that may be of a length that is independent of exposure time lengths of sensing elements belonging to other ROIs. In other words, the ROIs may be exposed so that all pixels, i,e. sensing elements, belonging to one and the same ROI, start and end their exposure at the same time.

Note that a ROI may be exposed individually with the same or a different exposure time as another ROI. All, or at least some, of the ROIs may be exposed using different exposure times. Said at least some of the ROIs may be consecutively located along an exposure direction with said different exposure times increasing or decreasing along the exposure direction. Different exposure times, how the exposures associated with different ROIs may be carried out, and the exposure direction, are further discussed below in connection with FIG. 6.

Action 403

The image sensing device 130 reads partial image data belonging to groups respectively associated with the exposed ROIs and resulting from sensed light therein, i.e. sensed light in the exposed ROIs, which sensed light was sensed during the exposure.

As should be realized, respective ROI is thus associated with its own partial image data (corresponding to one of said groups) resulting from sensing elements of the image sensor 131, which are located within the respective ROI. The present action thus relates to reading such partial image data for all exposed ROIs. The reading of partial image data may be performed row by row and some processing of the read partial image data may be performed in connection with this. This is typically efficient since e.g. intermediate storage in order to perform the processing later can be avoided. Also, note that, as will be explained below in connection with FIG. 6, reading partial image data associated with an ROI may be performed simultaneously as exposure(s) of other one or more ROI(s), which e.g. makes the use of ROIs according to embodiments herein time efficient. In some embodiments, binning is applied on, and during the reading of, at least some of the partial image data. This is an example of said "some processing" mentioned above. By binning is meant that data from more than one pixel is being combined to provide combined data corresponding to "super pixel" i.e. a resulting pixel with larger area than each pixel involved in the combination. Pixels subject to the binning may be made e.g. 2 or 4 times larger. As mentioned above the binning may be applied to accomplish more uniform resolution. That is, said ΔP resolution is reduced to obtain a more uniform ΔR resolution, alleviating said resolution problem. As explained, in the examples illustrated herein, each row corresponds to substantially equal distance, and hence in these examples it is mainly of interest to apply binning per row n.

It is advantageous to apply the binning during reading, such as before analogue to digital (A/D) conversion and not digitally after A/D conversion. This saves time and thus has less of a speed limiting effect than performing binning separately, after the reading.

As already indicated, binning is preferably applied more strongly in ROIs corresponding to nearer distances to the object. In the example of FIG. 1b, the near distance is the upper rows. Or in other words, the first, bottom row n is associated with the longest distance and the last, top row n is associated with the shortest, or nearest, distance. In case of ROIs as in e.g. FIG. 3a, strongest binning may thus be applied to the third ROI 303a, less strong binning may be applied to the second ROI 302a and the first ROI 301a may apply the least or no binning at all. Binning is preferably applied to the same degree within each ROI.

For a specific situation with given measuring system, such as the measuring system 100, properties thereof, certain requirements to be fulfilled etc., it is within the capacity of the skilled person to determine whether it is worthwhile to apply binning in the context of embodiments herein or not, and also where and to what extent it should be applied.

Action 404

A search direction may be associated with the sensor area 132. The image sensing device 130 may search in each ROI, after exposure thereof, and along each line of pixels parallel with the search direction, for respective one or more intensity peak positions fulfilling a search criterion.

Simple and quick processing for each ROI is enabled by the above search per ROI, where a relatively simple search criterion may be used, e.g. find the position of the strongest intensity peak, or first or last intensity peak, in each line of pixels, e.g. per column m. Positions of single peaks from multiple ROIs may then be used to find one final intensity peak position for each line of pixels in the search direction over the full sensor area 132, e.g. one final intensity peak position per column m. This way, an implementation may e.g. utilize fast on-chip processing per ROI to find the single intensity peak positions per ROI, thereby also reducing the amount of data. More complex processing may then be utilized, e.g. out-of-chip processing or at least processing outside of a circuit implementing the image sensor 131, for finding the final intensity peak positions based on the found intensity peak positions per ROI. Such more complex processing may e.g. be dynamic programming, mentioned above, that thus may be applied to said reduced amount of data for finding the final intensity peak positions.

The search direction may advantageously be parallel with the pixel columns, e.g. along the M pixel columns, or pixel rows n, e.g. along the N pixel rows, of the image sensor area 132. That is, so said each line of pixels corresponds to a respective pixel column m or a respective pixel row n. With the arrangement discussed and illustrated in the foregoing, a search direction along pixel columns m is preferred. In general a search direction along rows or columns enable less complex and thus quicker processing and/or less complex hardware for implementing the method, compared to if e.g. a diagonal search direction is used. If the image sensor 131 is associated with a fixed search direction, the image sensing device 130, and/or the image sensor 131 comprised in the image sensing device 130, may be arranged in a measuring system, such as the measuring system 100, so that there should only be one true reflection, as discussed above, in each line of pixels in the search direction. Alternatively, with a configurable search direction, the search direction may be chosen so that there will be expected only one true reflection in each line of pixels in the search direction.

The search direction will be further exemplified below in connection with FIG. 5b.

Action 405

The image sensing device 130 provides, based on a combination of the read partial image data, the image data relating to the image of the object. In case the search according to Action 404 is carried out, the provision of the image data for said image is further based on the intensity peak positions found from the search.

The image data may e.g. comprise information corresponding to a profile of an object being imaged, which profile may correspond to one of the profiles 140-1-140-K or the profile 141-1. The image data may be provided for internal use and/or further processing within the image sensing device 130, or be provided to an output port of the image sensing device 130. The output port may comprise one or more pins of a chip implementing the image sensing device 130, and/or an output data port in case the image sensing device 130 is implemented as a camera, e.g. as shown in FIG. 1a. In any case, the combined image data may be further processed and e.g. combined with other subsequent combined image data, e.g. corresponding to multiple profiles of the same object. The further processing may thus take part internally within the image sensing device 130 and/or externally by a separate data processing device, e.g. a computer.

The following actions extend Actions 401-405 so the method become a method for providing information on three dimensional characteristics of the object e.g. the profiles 140-1-141-K and 141-1 of the first object 120 and second object 121, respectively. A scenario is assumed where the image sensing device 130 is comprised in a measuring system suitable for providing, based on the provided image data according to Action 405, said information on three dimensional characteristics. The measuring system is in the following exemplified by the measuring system 100. The measuring system 100 comprises the light source 110 configured to illuminate the object e.g. any of the first, second or third objects 120, 121, 501, with the specific light pattern 112, e.g. the sheet of light as shown in FIG. 1a. The light source 110 and the image sensor 131 are arranged in relation to each other so that the specific light pattern 112, when reflected by said object at least partly become incident light on the sensor area 132 and sensed as said light from the object, e.g. the incident light pattern 133 sensed as light from the second object 121. The provided image data thereby comprise information convertible to the three dimensional characteristics of the object with regard to positions on the object, which positions cause said incident light pattern 133 on the sensor area 132.

Action 406

The image sensing device 130 may obtain image data for multiple images e.g. by performing the method according to Actions 401-405 once and repeating, one or more times, at least Actions 402-405, each time with the incident light on the image sensor 131 resulting from reflections on different parts of the object, e.g. the first object 120. Thereby the image sensing device 130 obtains a set of image data associated with multiple images of the object, e.g. corresponding to the profiles 140-1-140-K. That is, actions 402-405 may be repeated until there is a set with sufficient image data corresponding to profiles in order to e.g. be able to provide the information on three dimensional characteristics, such as be able to create a 3D model of the object based on the profiles to be able to create a 3D model of the object, e.g. the profiles 140-1-140-K to be able to create a 3D model of the first object 120. Note also Action 401 may be repeated one or more times if it e.g. is desirable to re-define the ROIs so that different ROIs are used for some of the multiple images.

Action 407

The image sensing device 130 may convert the set of image data to the information on 3D characteristics of the object. The information may e.g. correspond to said 3D model of the object, or portions of the object, and/or 3D related measures and/or properties of the object, such as length, volume, flatness etc. In accordance with previous explanations herein, it is implied that the conversion is based on knowledge of the geometry of the measuring system. For example, in case of the measuring system 100, knowledge resulting in how pixel positions m, n of the sensor area 132 relate, e.g. map, to the coordinates in the coordinate system 123.

To solve problems discussed above relating to provision of 3D characteristics of the object through imaging, it is, for reasons also discussed in the foregoing, desirable to be able to apply different exposures and/or processing to different parts of each image used for providing the 3D characteristics. In view of the above it should be realized that the method according to embodiments herein supports this, as well as fast execution. For example, through the ROIs, e.g. the ROIs 301a, 302a, 303a, and use thereof as described above, different exposure and at the same time relatively simple processing of image data are enabled per ROI, in particular for the purpose of providing information on 3D characteristics based on the image data. Instead of e.g. exposing the sensor area 132 fully and sequentially for different exposures, the partially overlapping ROIs enable parallel exposing and processing involving reduced data amounts (e.g. by peak position search, and/or binning, and/or different exposure, per ROI), while the partial overlap at the same time reduces the risk of missing information, such as information on peak positions, important for the provision of the information on 3D characteristics. Also, on-chip implementation is facilitated by the handling and processing per ROI. Moreover, on-chip processing of partial image data per ROI is facilitated and enables reduction of data amounts to be output from the chip for further processing compared to solutions where e.g. all image data for the full image is processed out-of-chip.

Figure 5A:
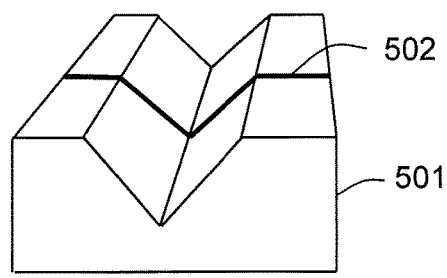
FIGS. 5a-c are schematic illustrations for exemplifying handling of intensity peaks in the context of embodiments herein.
Figure 5B:
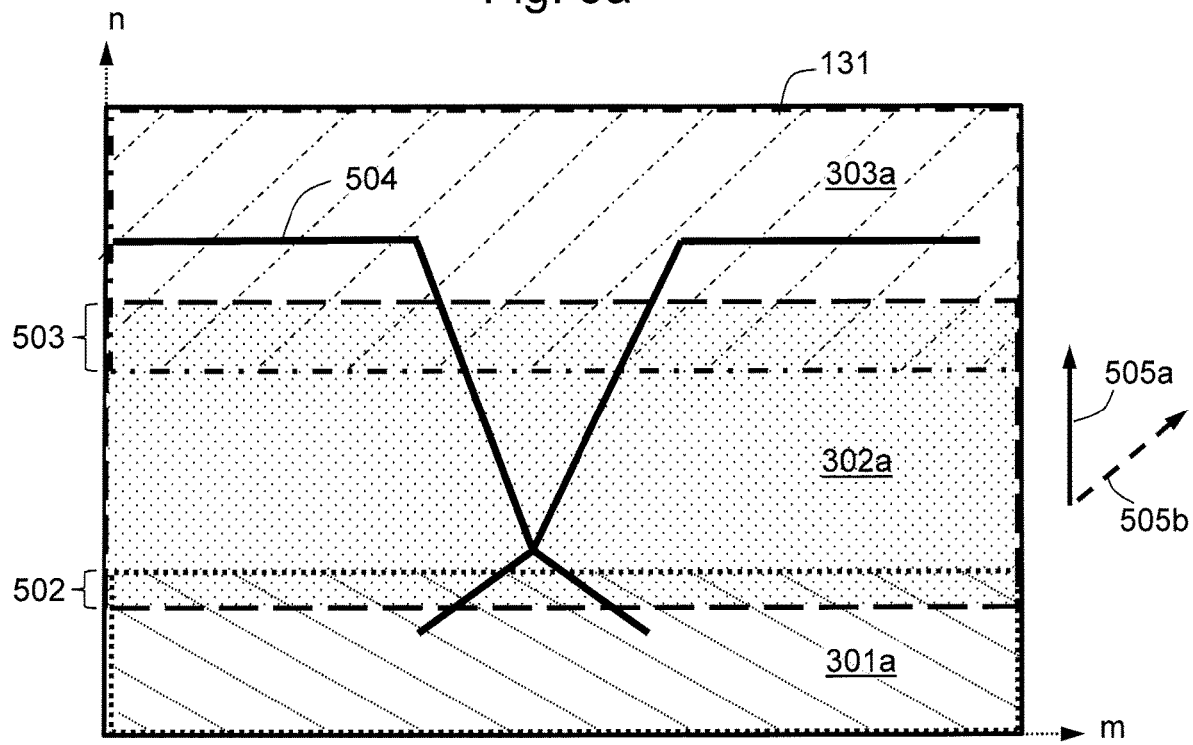
Figure 5C:
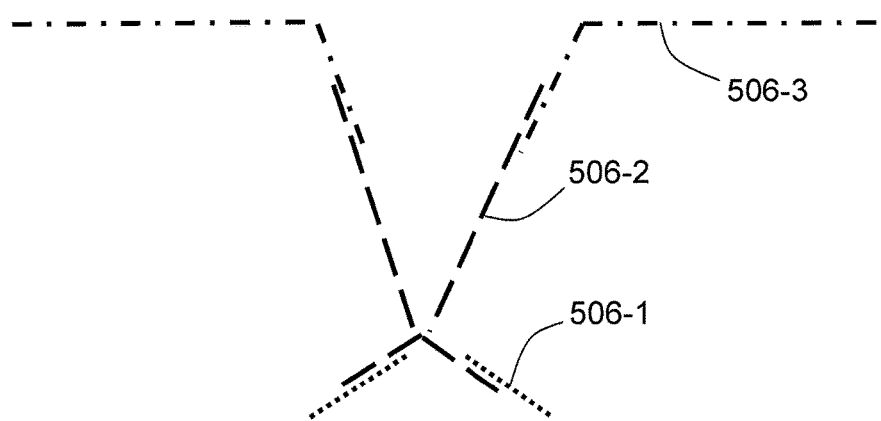

FIGS. 5a-c are schematic illustrations for exemplifying handling of intensity peaks in the context of embodiments herein. In the shown example a third object 501, schematically illustrated in FIG. 5a, is used instead of the first and second objects 120, 121, with a line of light 502 resulting from the specific light pattern 112 incident on the third object 501.

FIG. 5b shows a situation with ROIs defined in the image sensor area 132 corresponding to the example of FIG. 3a. That is, the first and second ROIs 301a, 302a partially overlap each other with a first partial overlap 502 and the second and third ROIs 302a and 303a partially overlap each other with a second partial overlap 503. In FIG. 5b it is further shown a schematic example of a second incident light pattern 504 in the sensor area 132, which second incident light pattern 504 is the result from the third object 501 reflecting the specific light pattern 112. As explained above, only one true intensity peak per column m is expected. However, by comparing the second light pattern 504 with the shape of the third object 501, it is realized that a lower part the second light pattern 504 corresponds to false intensity peaks. The false intensity peaks are a typical example of where the specific light pattern 112 has resulted in multiple reflections on the third object 501, i.e. such multiple reflections that were explained above as being problematic. In the figure it is further shown two different examples of search direction as introduced above under Action 404. A first search direction 505a and a second search direction 505b are exemplified. The first search direction 505a is along the M pixel columns, where each line of pixels being searched corresponds to a respective pixel column m as explained above under Action 404. As also explained above, a search direction along rows or columns is typically preferred, but other search directions, i.e. diagonal search directions, may be used. The second search direction 505b is an example of a diagonal search direction in the sensor area 132. There may be one search direction per ROI but preferably it is one and the same search direction for all ROIs, which enables simpler implementation and faster processing. However, ROIs with different search directions are possible.

FIG. 5c schematically illustrates first, second and third intensity peak patterns 506-1, 506-2, 506-3, respectively. The first intensity peak pattern 506-1 corresponds to intensity peaks registered by sensing elements of the image sensor 131 in the first ROI 301a, after the first ROI 301a, e.g. in accordance with Action 402, has been exposed individually to incident light, which incident light here comprise the second light pattern 504. Similarly, the second intensity peak pattern 506-2 corresponds to intensity peaks registered by sensing elements of the image sensor 131 in the second ROI 302a, etc., and the third intensity peak pattern 506-3 corresponds to intensity peaks registered by sensing elements of the image sensor 131 in the third ROI 303a, etc.

In view of FIGS. 5a-c, Action 404 may be better understood. As in Action 404 there may be a separate search per ROI 301a, 302a, 303a in order to identify respective intensity peak pattern, e.g. corresponding to the respective shown intensity peak pattern 506-1, 506-2, 506-4. The separate search may be implemented as a relatively simple and efficient search, integrated with basic functionality of the image sensor 131. For example, per column m in each ROI 301a, 302a, 303a, it may be searched for a greatest intensity peak, or a first intensity peak according to some criterion. This could be efficiently implemented in high integration with the image sensor 131, with the need to only remember and store one peak position value per column for each ROI 301a, 302a, 303a. Note that the intensity value of the peak position may be stored in addition to the peak position value as such. It may suffice that the image sensor 131 provides image data that identify one resulting intensity peak value per column and per ROI 301a, 302a, 303a, i.e. provides, per ROI, a reduced data amount based on the partial image data from the sensing elements of the ROI in question. The image sensing device 130 may then, based on such reduced data amounts for all ROIs, provide combined image data as in Action 405, e.g. corresponding to a profile of the object being imaged, here the third object 501.

Note that a search resulting in only one peak per column m and ROI cannot result in the second intensity pattern 504-2 in FIG. 5c, which contains two peaks per column m. In case of a simple, "one intensity peak", search, the second intensity pattern 504-2 could instead e.g. be a discontinuous pattern fully or partly containing also the lower, false intensity peaks, but with only one intensity peak per column m. However, when intensity patterns for all ROIs 301a, 302a, 303a are taken into account, there may still be multiple intensity peaks per column m for the full image sensor area 132, e.g. including false peaks corresponding to the first intensity pattern 504-1. Such resulting multiple intensity peaks may be handled in connection with provision, as in Action 405, of the image data based on a combination of the read partial image data. For example, the reduced data amounts for all ROIs may be further processed internally in the image sensing device 130 and then provided as the image data, or the reduced data amount for all ROIs may be provided as the image data and e.g. be further processed externally. In any case, the further processing may involve the previously mentioned dynamic programming and/or some algorithm(s) taking into account also neighboring columns m, conditions on smoothness of and/or continuity of intensity peak patterns corresponding to a profile. For this purpose also image data from one or more preceding or subsequent profiles of the object being imaged may be taken into account.

Figure 6:
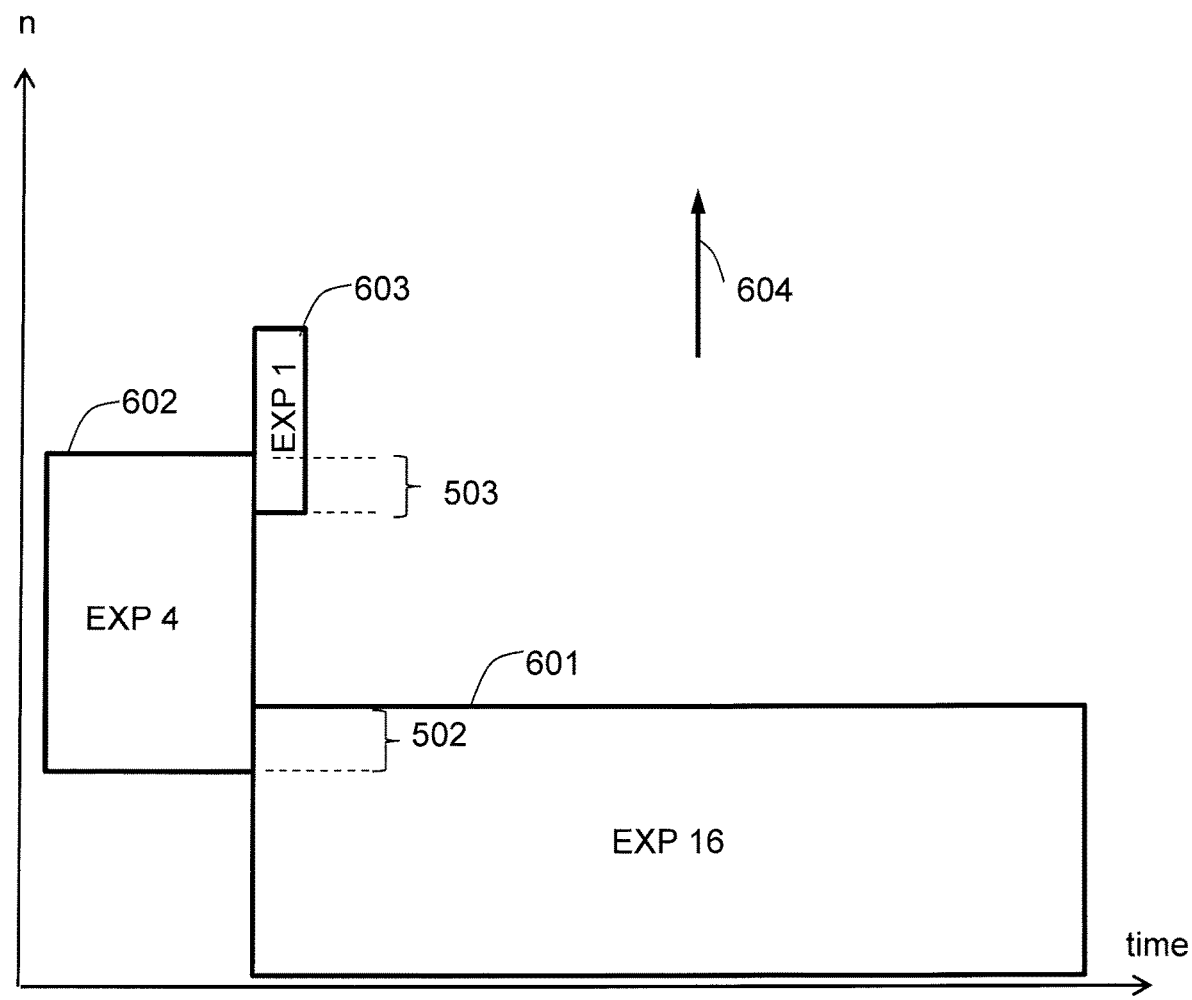
FIG. 6 is a schematic illustration for exemplifying exposure of different ROIs in the context of embodiments herein.

FIG. 6 is a schematic illustration for exemplifying exposure of different ROIs in the context of embodiments herein, as discussed above under Action 402. For example, a first exposure block 601 exemplifies an exposure time of 16 time units associated with the first ROI 301a, a second exposure block 602 exemplifies an exposure time of 4 time units associated with the second ROI 301b and a third exposure block 603 exemplifies an exposure time of 1 time unit associated with the third ROI 301c. One time unit may be e.g. 10 milliseconds (ms). That is, in the shown example, there is a difference by a factor 4 in exposure time between each exposure block. In general, what difference (e.g. increase with increasing distance to the object being imaged) to use in exposure times between ROIs may be determined based on knowledge of the measurement system being used, e.g. the measuring system 100, light conditions thereof etc., and/or based on "learned data". Also, the difference in exposure time between the ROIs may be based on the exposure times needed or that are desirable for the "outmost" ROIs, i.e. ROIs that correspond to a longest and shortest distance to the object being imaged. ROIs in-between may then be associated with appropriate, e.g. proportional, exposure times between said exposure times associated with the outmost ROIs.

In the shown example, the ROIs are decreasingly exposed along the rows, e.g. so that "lower" rows in the shown figure are exposed using longer exposure times and "upper" rows using shorter exposure times. With the incident first light pattern 133 as illustrated in FIG. 1b on the sensor area 132, the near distance is the upper rows which thus are exposed a shorter time and the lower rows are exposed a longer time. This may be utilized to alleviate the aforementioned problem of dynamic range.

In the figure it is further shown an example of an exposure direction 604 as introduced above under Action 402, along which the ROIs 301a, 302a, 303c are consecutively located. The exposure times decrease along the shown exposure direction 604. The exposure direction 604 is the same for all ROIs, at least per execution of Action 402.

In general, ROIs may beneficially be exposed so the exposure direction 604 is in a "near/far" direction vs. the object being imaged, e.g. the first, second or third objects 120, 121, 501, respectively, so that parts of the object that are farther away from the sensor area 132 are exposed during a longer time. Note that in case a search direction, e.g. the search direction 505a discussed above in connection with FIG. 5b, there may, but not need to, be an exposure direction, such as the exposure direction 604, that is in the same direction.

Moreover, FIG. 6 depicts the situation discussed above under Action 402 where the ROIs are exposed so that all pixels belonging to one and the same ROI, start and end their exposure at the same time. This is consistent with the mentioning under Action 402 that each ROI may be considered associated with its own shutter that is the same for all sensing elements of the ROI in question. Also, this minimizes the total time needed for the exposures and typically also facilitates simpler implementation, than in case of e.g. a shutter that is individual for each row, a so called rolling shutter.

Furthermore, as illustrated in FIG. 6, partially overlapping ROIs may be exposed sequentially. See e.g. the first and third exposure blocks 601, 603, associated with the first and third ROIs 301a, 303a, respectively, which are positioned after the second exposure block 602 associated with the second ROI 301b. Sequential exposure, i.e. exposures separated in time, may be necessary when the partial overlap means that ROIs share sensing elements in the overlap and individual exposure of the ROIs is to be accomplished. However, non-overlapping ROIs may and are advantageously exposed at least partly simultaneously, as is the case in FIG. 6 for the first and third exposure blocks 601, 603, associated with the first and third ROIs 301a, 303a, respectively. Exposing ROIs at least partially reduces total exposure time and thus enabling faster execution of the method according to embodiments herein. Note that when exposure of a ROI is finished, the partial image data associated with that ROI may be read out as part of Action 403, while exposure of one or more other ROIs may be ongoing. Hence, not only exposures of non-overlapping ROIs may be performed simultaneously, but also may reading out partial image data associated with an ROI be performed simultaneously as exposure(s) of other one or more ROI(s).

Figure 7:
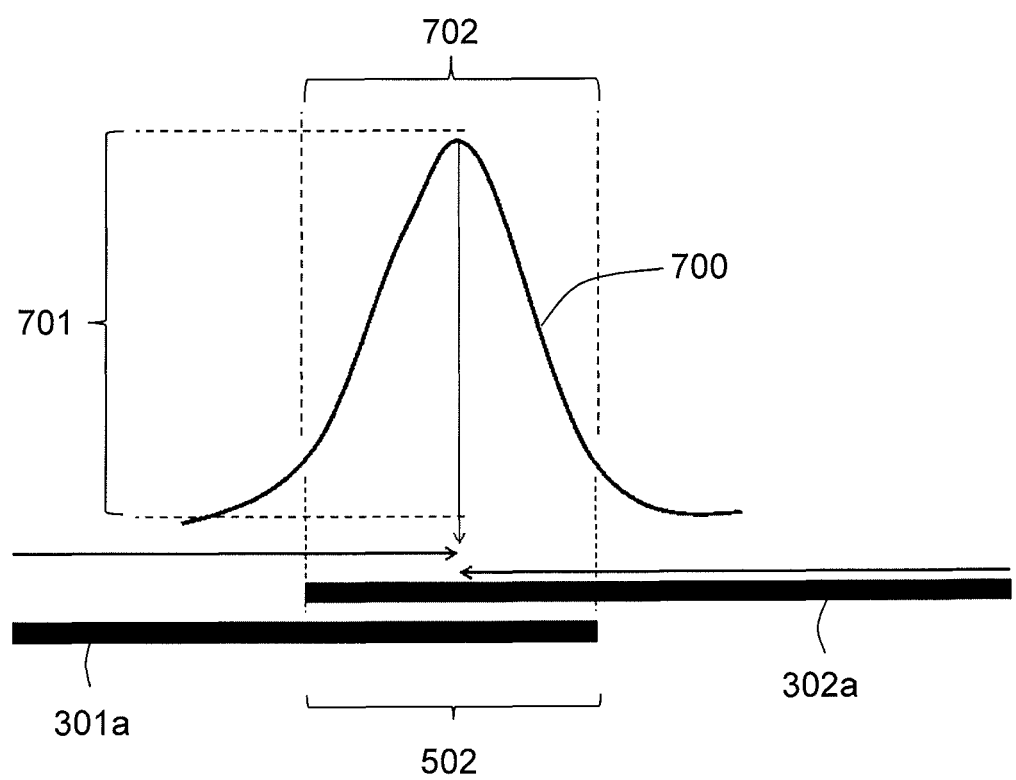
FIG. 7 is a schematic illustration for exemplifying partial overlap between ROIs in the context of embodiments herein.

FIG. 7 is a schematic illustration for exemplifying partial overlap between ROIs in the context of embodiments herein. The first partial overlap 502 between the first ROI 301a and the second ROI 302a has been selected as example and is shown for a single column m. A schematic example of an intensity peak 700 is also shown, having an intensity peak height 701 and an intensity peak width 702. Each of one or more partial overlaps, e.g. the first partial overlap 502 and/or the second partial overlap 503, in the search direction (see Action 404 and FIG. 5b), may be based on, or should be at least, a predicted largest intensity peak width of incident light on the sensor area 132. This situation is illustrated in FIG. 7 for the partial overlap 502. The intensity peak width 702 may thus in the following be assumed to correspond to the predicted largest intensity peak width of incident light on the sensor area 132. Such "at least" partial overlap reduces the risk of missing intensity peaks that are located at joints between ROIs, which else risk being more or less of "blind spots", and thus has an effect of improving accuracy of the image sensing device 130. It is realized that the larger amount of ROIs being used, the risk of intensity peaks at joints increases and it becomes increasingly important with the partial overlap. Also, some partial overlap, even if smaller than the largest expected intensity peak width 702, may still at least reduce the risk of missing intensity peaks. What largest expected intensity peak width to expect is within the capacity of the skilled person to determine in view of circumstances, e.g. in view of details regarding a measuring system, e.g. the measuring system 100, being used with the image sensing device 130, what specific light source, e.g. light source 110, is being used, distances involved for the light to travel etc. Also, routine testing and measuring may of course be applied to find the largest expected intensity peak width. In any case, the largest expected intensity peak width is typically within an order of 10 pixels, such as 5, 10, or 15 pixels, just to mention some specific examples.

At the same time as a partial overlap is desirable for the above reasons, it may also be advantageous to keep the overlap small since a too large overlap may not be connected with any particular advantages and may only result in redundant data to read and may thus be associated with longer reading time, i.e. time for performing Action 403, thus having a potentially speed-limiting effect on execution of the method according to embodiments herein. Hence, it may be advantageous that said each of one or more partial overlaps, e.g. the first partial overlap 502 and the second partial overlap 503, in the search direction, e.g. the first search direction 505*a*, is at most a factor 2 times the predicted largest intensity peak width.

Figure 8A:
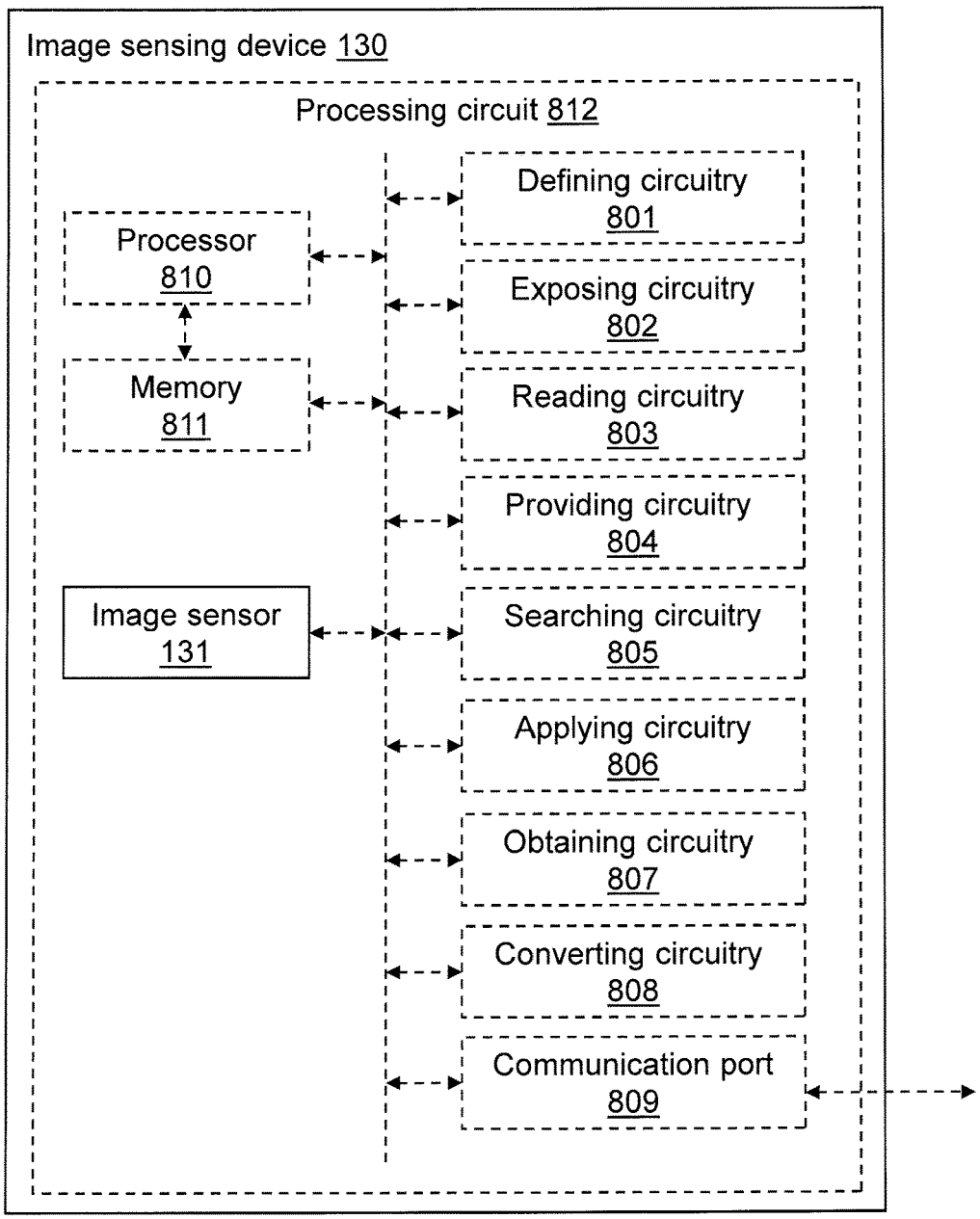
FIGS. 8a-b are schematic block diagrams illustrating an image sensing device and a measuring system according to embodiments herein.

To perform the actions 401-407 described above in connection with FIG. 4, for providing image data relating to an image of said object, the image sensing device 130 may comprise an arrangement schematically depicted in FIG. 8*a*. As already mentioned, the image sensing device 130 comprises the image sensor 131.

The image sensing device 130, or a defining circuitry 801 comprised in the image sensing device 130, is configured to define the ROIs, e.g. ROIs 301*a*-303*a*, in the image sensor area 132, where each ROI is partially overlapping one or more of the other ROIs.

The image sensing device 130, or an exposing circuitry 802 comprised in the image sensing device 130, is configured to expose the ROIs individually to the light from the object. In some embodiment the image sensing device 130, or the exposing circuitry 802, is further configured to expose the partially overlapping ROIs, such as ROIs 301*a*, 302*a*, sequentially and the non-overlapping ROIs, such as ROIs 301*a*, 303*a*, at least partly simultaneously.

The image sensing device 130, or a reading circuitry 803 comprised in the image sensing device 130, is configured to read the partial image data belonging to said groups respectively associated with the exposed ROIs and resulting from sensed light therein.

The image sensing device 130, or a providing circuitry 804 comprised in the image sensing device 130, is configured to provide, based on said combination of the read partial image data, the image data relating to the image of the object.

The image sensing device 130, or a searching circuitry 805 comprised in the image sensing device 130, may be configured to search in each ROI, after exposure thereof and along each line of pixels parallel with the search direction, for said respective one or more intensity peak positions fulfilling said search criterion. In this case the provision of the image data for said image is further based on the intensity peak positions found from the search.

The image sensing device 130, or an applying circuitry 806 comprised in the image sensing device 130, may be configured to apply said binning on, and during the reading of, at least some of the partial image data.

The image sensing device 130, or an obtaining circuitry 807 comprised in the image sensing device 130, may be configured to obtain the image data for said multiple images by performing Action 406 above, i.e. by performing the method according to Actions 401-405 once and repeating, one or more times, at least Actions 402-405, each time with the incident light on the image sensor 131 resulting from reflections on different parts of the object, e.g. the first object 120. Thereby the image sensing device 130 may obtains the set of image data associated with the multiple images of the object.

The image sensing device 130, or an converting circuitry 808 comprised in the image sensing device 130, may be configured to convert the set of image data to said information on three dimensional characteristics of the object, e.g. the profiles 140-1-140-K of the first object 120.

The image sensing device 130, of course, typically comprises a communication port 809 that in general is configured to participate in sending and/or receiving information including data to and/or from the image sensing device 130. For example, in embodiments where the obtaining circuitry 807 and the converting circuitry 808 are external from the image sensing device 130, as e.g. discussed below in connection with FIG. 8*b*, the image sensing device 130, or the providing circuitry 804, may be configured to provide the image data by sending it via the communication port 809 externally to the obtaining circuitry 807 that may be located elsewhere in the measuring system 100 e.g. in a separate unit. In embodiments where the obtaining circuitry 807 and the converting circuitry 808 are integrated with the image sensing device 130, the converting circuitry 808 may be further configured to output the information on said three dimensional characteristics, e.g. the profiles 140-1-140-K, via the communication port 802.

Figure 8B:
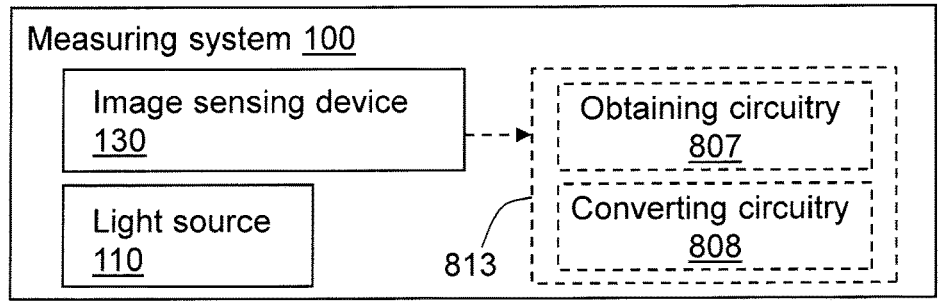

FIG. 8*b* schematically shows a minimum configuration of the measuring system 100 for some embodiments herein. As already indicate above, the minimum configuration comprises the image sensing device 130 and the light source 110, configured to illuminate the object, e.g. any of the first, second or third objects 120, 121, 501, with the specific light pattern 112, e.g. a sheet of light as shown in FIG. 1*a*. The light source 110 and the image sensor 131 (comprised in the image sensing device 130), are arranged in relation to each other so that the specific light pattern 112, when reflected by said object at least partly become incident light, e.g. the incident light pattern 133, on the sensor area 132 and sensed as said light from the object.

FIG. 8*b* further indicates, by dotted lines, that the obtaining circuitry 807 and the converting circuitry 808, alternatively to what is shown in FIG. 8*a*, may be external from the image sensing device 130 but still comprised in the measuring system 100, e.g. comprised in a separate data processing unit 813, such as a computer.

The embodiments of the image sensing device 130 and/or measuring system 100 may be fully or partly implemented through one or more processors, such as a processor 810 depicted in FIG. 8*a*, together with a computer program for performing the functions and actions of embodiments herein. In some embodiments the circuitry and ports discussed above may be fully or partially implemented by the processor 810.

In some embodiments, illustrated with support from the schematic drawings in FIGS. 9*a*-*d*, further explained separately below, there is provided a first computer program 901*a* and/or a second computer program 901*b*.

When executed by a first data processing apparatus, e.g. the processor 810, the first computer program 901*a* causes the image sensing device 130 to perform the method according to embodiments herein as described above.

Figure 9A:
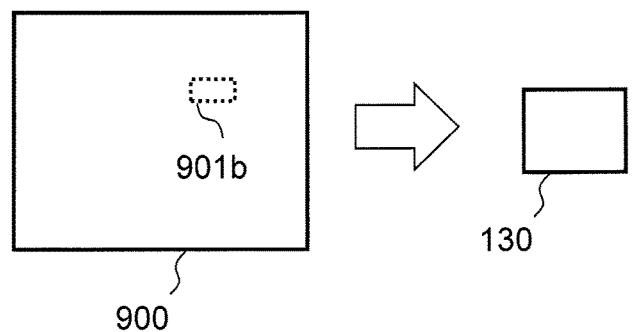
FIGS. 9a-d are schematic drawings for illustrating computer program related embodiments regarding the image sensing device.

As schematically illustrated in FIG. 9*a*, when executed by a second data processing apparatus 900, e.g. a computer, the second computer program 901*b* causes hardware, typically a chip, to be synthesized, and/or be configured, as the image sensing device 130 according to embodiments herein as described above. The second data processing apparatus may be a conventional one for hardware synthesizing based on some conventional programming language for hardware synthesizing, e.g. Very High Speed Integrated Circuit Hardware Description Language (VHDL).

Figure 9B:
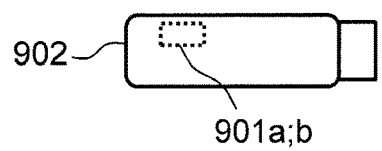
Figure 9C:
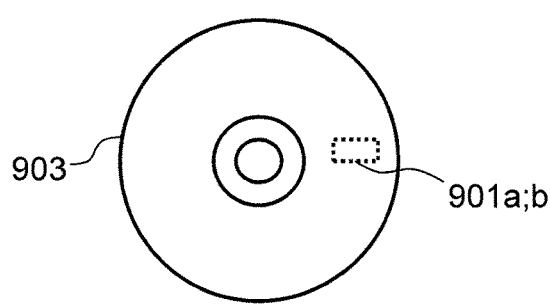
Figure 9D:
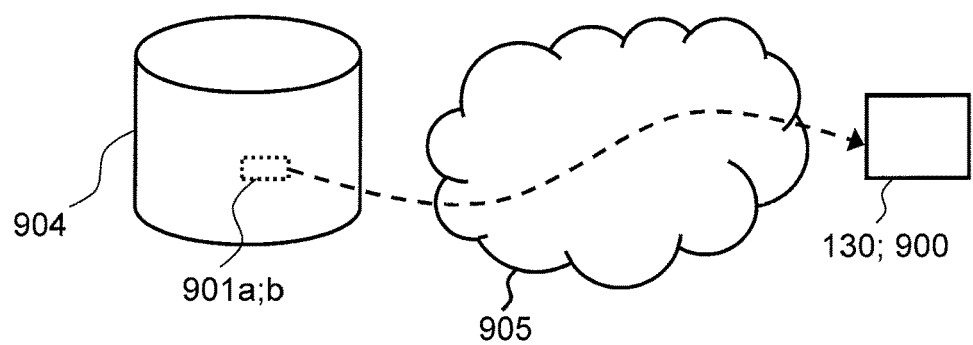

In some embodiments, also illustrated with support from the schematic drawings in FIGS. 9b-d, there is provided a computer program product, comprising a computer-readable medium on which the first computer program 901a and/or the second computer program 901b are stored. By computer readable medium it is excluded a transitory, propagating signal and the computer readable medium may correspondingly be named non-transitory computer readable medium. Examples of the a computer-readable medium is a memory card or a memory stick 902 as in FIG. 9b, a disc storage medium 903 such as a CD or DVD as in FIG. 9c, a mass storage device 904 as in FIG. 9d. The mass storage device 904 is typically based on hard drive(s) or Solid State Drive(s) (SSD). The mass storage device 904 may be such that is used for storing data accessible over a computer network 905, e.g. the Internet or a Local Area Network (LAN).

The computer programs 901a and/or 901b may furthermore be provided as a pure computer program or comprised in a file or files. The file or files may be stored on the computer-readable memory and e.g. available through download e.g. over the computer network 905, such as from the mass storage device 904 via a server. The server may e.g. be a web or file transfer protocol (ftp) server. In case of the first computer program 901a, the file or files may e.g. be executable files for direct or indirect download to and execution on the image sensing device 130, e.g. on the processor 810, or may be for intermediate download and compilation involving the same or another processor to make them executable before further download and execution. In case of the second computer program 901b, the file or files may e.g. be executable files for direct or indirect download to and execution by the second data processing apparatus 900, or may be for intermediate download and compilation involving the same or another computer to make them executable before further download and execution on the hardware synthesizing apparatus 906.

The image sensing device 130 may further comprise a memory 811, depicted in FIG. 8, comprising one or more memory units. The memory 811 is arranged to store data, such as the first computer program 901a and/or image data and/or configurations for performing the functions and actions of embodiments herein.

Those skilled in the art will also appreciate that the ports and circuitry 801-808 may refer to a combination of analog and digital circuits, and/or one or more processors configured with software and/or firmware (e.g., stored in memory) that, when executed by the one or more processors such as the processor 810, perform as described above. For example, in some embodiments there may be multiple processors, each associated with a respective column m of the M columns, or with a respective subgroup of the M columns. One or more of these processors, as well as the other digital hardware, may be included in a single ASIC, or several processors and various digital hardware may be distributed among several separate components, whether individually packaged or assembled into an SoC.

As a further example, the image sensing device 130 may comprise a processing circuit 812, which may comprise one or more of the circuit(s) and/or port(s) etc., mentioned above. As used herein, the term "processing circuit" may relate to a processing unit, a processor, an ASIC, a Field-Programmable Gate Array (FPGA) or the like. As an example, a processor, an ASIC, an FPGA or the like may comprise one or more processor kernels. In some examples, the processing circuit may be embodied by a software and/or hardware module.

For example, in embodiments mentioned above where the second computer program 901b executed by the second data processing apparatus 900 causes synthesizing of a chip for implementing the image sensing device 130, the chip may correspond to the processing unit 812.

FIGS. 9a-d, already mentioned above, are schematic drawings for illustrating embodiments related to computer program embodiments and have been used and discussed above.

The underlying principles of what has been discussed herein will of course work with other arrangements than in the specific examples above. Also, the skilled person is able to find out how to arrange and/or configure the image sensing device 130 with the image sensor 131 in a specific measuring system e.g. corresponding to the measuring system 100, to be able to efficiently utilize the capabilities of the image sensing device 130 and advantages of embodiments herein, even though the specific measuring system and details may depart from specific examples in the present disclosure. It should also be noted that what is named rows and columns may be a matter of definition, e.g. what is called rows in the present disclosure may be called columns in another case and vice versa.

As used herein, the term "memory" may refer to a hard disk, a magnetic storage medium, a portable computer disc, flash memory, random access memory (RAM) or the like. Furthermore, the memory may be an internal register memory of a processor.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Naming herein may use enumerating terms as "first", "second", "a", "b", etc., in order to accomplish unique naming. The enumerating terms typically follow in order of presentation in the present disclosure. They shall not, without explicit information on the contrary, be interpreted as implying any other order, such as order of execution, priority etc., nor be interpreted as implying any dependency. For example, an embodiment may involve an item that herein is named "second" without having to involve another, similar, item that herein is named "first", etc.

When using the word "comprise" or "comprising" it shall be interpreted as non-limiting, i.e. meaning "consist at least of".

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image sensing device, for providing image data relating to an image of an object by taking multiple exposures of the object, the image sensing device comprising an image sensor having a sensor area for sensing light, wherein the method comprises:
   defining Regions Of Interest, "ROIs", in the sensor area, each ROI including multiple lines of sensing elements that each comprise multiple sensing elements from a corresponding line of the sensor area so that each ROI has a height of multiple sensing elements and a width of multiple sensing elements, and each ROI partially overlapping one or more of the other ROIs in the sensor area of the image sensor so that some sensing elements of the sensor area are included in multiple ROIs;
   using the image sensing device to capture the image data with multiple exposures at different times, each exposure activating a different ROI of the ROIs in the sensor area of the image sensor by, for each respective ROI of the ROIs in the sensor area:
   (i) beginning a shutter-time for the image sensing device,
   (ii) exposing sensing elements of the image sensor that are within the respective ROI, including one or more portions of the respective ROI that partially overlap one or more of the other ROIs, to light from the object without exposing sensing elements of the image sensor that are outside of the respective ROI to light from the object, wherein all sensing elements in the multiple lines that belong to the respective ROI start and end their exposure at the same time,
   (iii) reading partial image data belonging to the exposed sensing elements for the respective ROI, and
   (iv) ending a shutter-time for the image sensing device, wherein exposing a first ROI of the ROIs in the sensor area includes exposing all sensing elements for the multiple lines that belong to the first ROI at a first same time, including sensing elements that are within both the first ROI and a second ROI of the sensor area, and wherein exposing the second ROI includes exposing all sensing elements for the multiple lines that belong to the second ROI at a second same time, including the sensing elements that are within both the first ROI and the second ROI; and
   providing, based on a combination of the partial image data that is read after the multiple exposures with each of the multiple exposures activating a different ROI of the ROIs in the sensor area, the image data relating to the image of the object.

2. The method as claimed in claim 1, wherein at least some of the ROIs are exposed using different exposure times.

3. The method as claimed in claim 1, wherein at least some of the ROIs are consecutively located along an exposure direction and are exposed using different exposure times that increase or decrease along the exposure direction.

4. The method as claimed in claim 1, wherein the ROIs are consecutively located along either pixel columns or pixel rows of the sensor area.

5. The method as claimed in claim 1, wherein a search direction is associated with the sensor area and the method further comprises:
   searching in each ROI, after exposure thereof and along each line of pixels parallel with the search direction, for respective one or more intensity peak positions fulfilling a search criterion, wherein the provision of the image data for said image is further based on the intensity peak positions found from the search.

6. The method as claimed in claim 5, wherein the search direction is parallel with pixel columns or pixel rows of the sensor area, whereby said each line of pixels corresponds to a respective pixel column or a respective pixel row.

7. The method as claimed in claim 5, wherein each of one or more partial overlaps between ROIs in the search direction is at least a predicted largest intensity peak width of incident light on the sensor area.

8. The method as claimed in claim 7, wherein said each of one or more partial overlaps in the search direction is at most a factor 2 times the predicted largest intensity peak width.

9. The method as claimed in claim 1, wherein the provided image data is at least convertible to information on three dimensional characteristics of the object.

10. The method as claimed in claim 1, wherein the image sensing device is comprised in a measuring system for providing information on three dimensional characteristics of the object based on the provided image data, the measuring system further comprising a light source configured to illuminate the object with a specific light pattern, the light source and the image sensor being arranged in relation to each other so that the specific light pattern when reflected by the object at least partly becomes incident light on the sensor area and sensed as said light from the object, whereby the provided image data comprise information convertible to the information on the three dimensional characteristics of the object regarding positions on the object which positions cause said incident light on the sensor area.

11. The method of claim 1, wherein each ROI includes multiple lines of sensing elements that each comprise all sensing elements from a corresponding line of the sensor area.

12. The method of claim 1, wherein:
   the first ROI has a first exposure time between beginning the shutter-time for the first ROI and ending the shutter-time for the first ROI;
   the second ROI has a second exposure time between beginning the shutter-time for the second ROI and ending the shutter-time for the second ROI;
   the second exposure time begins after the first exposure time ends; and
   the second exposure time is different than the first exposure time.

13. A method for providing information on three dimensional characteristics of an object by taking multiple exposures of the object, wherein the method comprises:
   defining Regions Of Interest, "ROIs", in a sensor area of an image sensor of an image sensing device, each ROI including multiple lines of sensing elements that each comprise multiple sensing elements from a corresponding line of the sensor area so that each ROI has a height of multiple sensing elements and a width of multiple sensing elements, and each ROI partially overlapping one or more of the other ROIs in the sensor area of the image sensor so that some sensing elements of the sensor area are included in multiple ROIs;
   using the image sensing device to capture the image data with multiple exposures at different times, each exposure activating a different ROI of the ROIs in the sensor area of the image sensor by, for each respective ROI of the ROIs in the sensor area:
   (i) beginning a shutter-time for the image sensing device, (ii) exposing sensing elements of the image sensor that are within the respective ROI, including one or more portions of the respective ROI that partially overlap one or more of the other ROIs, to light from the object without exposing sensing elements of the image sensor that are outside of the respective ROI to light from the object, wherein all sensing elements in the multiple lines that belong to the respective ROI start and end their exposure at the same time, (iii) reading partial image data belonging to the exposed sensing elements for the respective ROI, and (iv) ending a shutter-time for the image sensing device, wherein exposing a first ROI of the ROIs in the sensor area includes exposing all sensing elements for the multiple lines that belong to the first ROI at a first same time, including sensing elements that are within both the first ROI and a second ROI of the sensor area, and wherein exposing the second ROI includes exposing all sensing elements for the multiple lines that belong to the second ROI at a second same time, including the sensing elements that are within both the first ROI and the second ROI;

providing, based on a combination of the partial image data that is read after the multiple exposures with each of the multiple exposures activating a different ROI of the ROIs in the sensor area, the image data relating to the image of the object, wherein an image sensing device is comprised in a measuring system for providing information on three dimensional characteristics of the object based on the provided image data, the measuring system further comprising a light source configured to illuminate the object with a specific light pattern, the light source and the image sensor being arranged in relation to each other so that the specific light pattern when reflected by the object at least partly becomes incident light on the sensor area and sensed as said light from the object, whereby the provided image data comprise information convertible to the information on the three dimensional characteristics of the object regarding positions on the object, which positions cause said incident light on the sensor area;

repeating, one or more times, at least the exposing, reading and providing, each time with the incident light on the image sensor resulting from reflections on different parts of the object, thereby obtaining a set of image data associated with multiple images of the object; and converting the set of image data to the information on three dimensional characteristics of the object.

14. An image sensing device for providing image data relating to an image of an object, the image sensing device comprising an image sensor having a sensor area for sensing light, wherein the image sensing device is configured to:

define Regions Of Interest, "ROIs", in the sensor area, each ROI including multiple lines of sensing elements that each comprise multiple sensing elements from a corresponding line of the sensor area so that each ROI has a height of multiple sensing elements and a width of multiple sensing elements, and each ROI partially overlapping one or more of the other ROIs in the sensor area of the image sensor so that some sensing elements of the sensor area are included in multiple ROIs;

use the image sensing device to capture the image data with multiple exposures at different times, each exposure activating a different ROI of the ROIs in the sensor area of the image sensor by, for each respective ROI of the ROIs in the sensor area:

(i) beginning a shutter-time for the image sensing device, (ii) exposing sensing elements of the image sensor that are within the respective ROI, including one or more portions of the respective ROI that partially overlap one or more of the other ROIs, to light from the object without exposing sensing elements of the image sensor that are outside of the respective ROI to light from the object, wherein all sensing elements in the multiple lines that belong to the respective ROI start and end their exposure at the same time, (iii) reading partial image data belonging to the exposed sensing elements for the respective ROI, and (iv) ending a shutter-time for the image sensing device, wherein exposing a first ROI of the ROIs in the sensor area includes exposing all sensing elements for the multiple lines that belong to the first ROI at a first same time, including sensing elements that are within both the first ROI and a second ROI of the sensor area, and wherein exposing the second ROI includes exposing all sensing elements for the multiple lines that belong to the second ROI at a second same time, including the sensing elements that are within both the first ROI and the second ROI; and provide, based on a combination of the partial image data that is read from the ROIs in the sensor area, the image data relating to the image of the object.

15. The image sensing device as claimed in claim 14, wherein at least some of the ROIs are exposed using different exposure times.

16. The image sensing device as claimed in claim 14, wherein at least some of the ROIs are consecutively located along an exposure direction and are exposed using different exposure times that increase or decrease along the exposure direction.

17. The image sensing device as claimed in claim 14, wherein the ROIs are consecutively located along either pixel columns or pixel rows of the sensor area.

18. The image sensing device as claimed in claim 14, wherein a search direction is associated with the sensor area and the image sensing device is further configured to:

search in each ROI, after exposure thereof and along each line of pixels parallel with the search direction, for respective one or more intensity peak positions fulfilling a search criterion, wherein the provision of the image data for said image is further based on the intensity peak positions found from the search.

19. The image sensing device as claimed in claim 18, wherein the search direction is parallel with pixel columns or pixel rows of the sensor area, whereby said each line of pixels corresponds to a respective pixel column or a respective pixel row.

20. The image sensing device as claimed in claim 18, wherein each of one or more partial overlaps between ROIs in the search direction is at least a predicted largest intensity peak width of incident light on the sensor area.

21. The image sensing device as claimed in claim 20, wherein said each of one or more partial overlaps in the search direction is at most a factor 2 times the predicted largest intensity peak width.

22. The image sensing device as claimed in claim 14 wherein the provided image data is at least convertible to information on three dimensional characteristics of the object.

23. A non-transitory computer storage media encoded with computer program instructions that when executed by a data processing apparatus cause an image sensing device to perform operations comprising:
defining Regions Of Interest, "ROIs", in a sensor area of an image sensor of the image sensing device, each ROI including multiple lines of sensing elements that each comprise multiple sensing elements from a corresponding line of the sensor area so that each ROI has a height of multiple sensing elements and a width of multiple sensing elements, and each ROI partially overlapping one or more of the other ROIs in the sensor area of the image sensor so that some sensing elements of the sensor area are included in multiple ROIs;
using the image sensing device to capture the image data with multiple exposures at different times, each exposure activating a different ROI of the ROIs in the sensor area of the image sensor by, for each respective ROI of the ROIs in the sensor area:
  (i) beginning a shutter-time for the image sensing device,
  (ii) exposing sensing elements of the image sensor that are within the respective ROI, including one or more portions of the respective ROI that partially overlap one or more of the other ROIs, to light from the object without exposing sensing elements of the image sensor that are outside of the respective ROI to light from the object, wherein all sensing elements in the multiple lines that belong to the respective ROI start and end their exposure at the same time,
  (iii) reading partial image data belonging to the exposed sensing elements for the respective ROI, and
  (iv) ending a shutter-time for the image sensing device, wherein exposing a first ROI of the ROIs in the sensor area includes exposing all sensing elements for the multiple lines that belong to the first ROI at a first same time, including sensing elements that are within both the first ROI and a second ROI of the sensor area, and wherein exposing the second ROI includes exposing all sensing elements for the multiple lines that belong to the second ROI at a second same time, including the sensing elements that are within both the first ROI and the second ROI; and
providing, based on a combination of the partial image data that is read after the multiple exposures with each of the multiple exposures activating a different ROI of the ROIs in the sensor area, the image data relating to the image of the object.

24. A measuring system for providing information on three dimensional characteristic of an object based on provided image data from an image sensing device, wherein the image sensing device comprises an image sensor having a sensor area for sensing light, the image sensing device being configured to:
define Regions Of Interest, "ROIs", in the sensor area, each ROI including multiple lines of sensing elements that each comprise multiple sensing elements from a corresponding line of the sensor area so that each ROI has a height of multiple sensing elements and a width of multiple sensing elements, and each ROI partially overlapping one or more of the other ROIs in the sensor area of the image sensor so that some sensing elements of the sensor area are included in multiple ROIs;
use the image sensing device to capture the image data with multiple exposures at different times, each exposure activating a different ROI of the ROIs in the sensor area of the image area by, for each respective ROI of the ROIs in the sensor area:
  (i) beginning a shutter-time for the image sensing device,
  (ii) exposing sensing elements of the image sensor that are within the respective ROI, including one or more portions of the respective ROI that partially overlap one or more of the other ROIs, to light from the object without exposing sensing elements of the image sensor that are outside of the respective ROI to light from the object, wherein all sensing elements in the multiple lines that belong to the respective ROI start and end their exposure at the same time,
  (iii) reading partial image data belonging to the exposed sensing elements for the respective ROI, and
  (iv) ending a shutter-time for the image sensing device, wherein exposing a first ROI of the ROIs in the sensor area includes exposing all sensing elements for the multiple lines that belong to the first ROI at a first same time, including sensing elements that are within both the first ROI and a second ROI of the sensor area, and wherein exposing the second ROI includes exposing all sensing elements for the multiple lines that belong to the second ROI at a second same time, including the sensing elements that are within both the first ROI and the second ROI; and
provide, based on a combination of the partial image data that is read after the multiple exposures with each of the multiple exposures activating a different ROI of the ROIs in the sensor area, the image data relating to the image of the object; and
the measuring system further comprising a light source configured to illuminate the object with a specific light pattern, the light source and the image sensor being arranged in relation to each other so that the specific light pattern when reflected by the object at least partly becomes incident light on the sensor area and sensed as said light from the object, whereby the provided image data comprise information convertible to the information on the three dimensional characteristics of the object regarding positions on the object, which positions cause said incident light on the sensor area.

25. The measuring system as claimed in claim 24, wherein the measuring system is configured to:
obtain image data for multiple images by causing the image sensing device to repeat, one or more times, at least the exposing, reading and providing, each time with the incident light on the image sensor resulting from reflections on different parts of the object, thereby obtaining a set of image data associated with multiple images of the object, and
convert the set of image data to the information on on the three dimensional characteristics of the object.

* * * * *